2,870,061
Patented Jan. 20, 1959

2,870,061

CONCENTRATES OF DIALKYL SULFOSUCCINATES

John A. Huggins, Evansville, Ind., assignor to Mead Johnson & Company, Evansville, Ind., a corporation of Indiana No Drawing. Application November 8, 1956
Serial No. 621,005

10 Claims. (Cl. 167—56)

This invention relates to new concentrated encapsulating compositions and more specifically to liquid concentrates of salts of dialkyl sulfosuccinic acids, and to methods for their production.

It is known that nontoxic salts of dialkyl sulfosuccinic acids are particularly valuable when introduced into the large intestine to relieve constipation when the latter is due to fecal impaction. The action of these compounds is to act as penetrants which enable other liquids to enter and soften hardened fecal masses and facilitate elimination of the same.

Generally, since the taste of the dialkyl sulfosuccinates is extremely disagreeable they are administered orally in rather dilute solutions of fruit juice to mask the taste or more recently in more concentrated form by way of gelatin capsules as described in the copending application of Bryan Serial No. 563,837, filed February 7, 1956. The encapsulated compositions described in that application are useful for relieving fecal impaction when orally ingested. However, it is to be noted that the preparations therein described are limited with respect to the concentration of the active ingredient that can be placed in a single capsule. While the method of administering dialkyl sulfosuccinates by capsule has advantages, there are several problems encountered with this procedure. One of these problems is that the solution which is contained in a soft gelatin capsule must be of such a nature that it will not dissolve the capsule shell. Further, the solvents utilized must be nontoxic. It is also necessary that the liquid preparation for encapsulation contain the active principle dialkyl sulfosuccinate in sufficient concentration to result in a capsule of a practical size to be orally ingested.

Accordingly, it is an object of the present invention to produce a concentrated solution of dialkyl sulfosuccinates that is compatible with plasticized gelatin capsules.

Another object is the production of concentrated solutions of dialkyl sulfosuccinates which are nontoxic.

A further object is the production of a dialkyl sulfosuccinate for encapsulation which contains the medicinal in high concentrations.

A still further object is the provision of a process for preparing clear, concentrated, nontoxic solutions of dialkyl sulfosuccinates having the characteristics enumerated above.

These and other objects will become apparent from the accompanying specification and claims.

From the foregoing it is clear that a concentrate having the attributes described above would have many valuable end uses. However, the selection of a solvent having the proper characteristics is rendered difficult in that simple solvents, which may be used for the dialkyl sulfosuccinates, have drawbacks which render them unsatisfactory in several respects. For example, liquid petrolatum is unsuitable in that the dialkyl sulfosuccinates are insufficiently soluble therein. Similarly, vegetable oils are also poor solvents and further have a tendency to leak from the gelatin capsules when formulated with dialkyl sulfosuccinates. Polyhydroxy alcohols are unsuitable when used alone in that they tend to dissolve soft gelatin capsules. Polyethylene glycols have little effect in gelatin capsules, but concentrations of dialkyl sulfosuccinates above 20 weight percent in said glycols are hazy or cloudy indicating an incompletely solubilized phase which is extremely difficult to remove by filtration. Accordingly, it has been found that a compound solvent of polyhydroxy alcohol and a polyethylene glycol may be used to prepare highly concentrated solutions of dialkyl sulfosuccinates which are nontoxic, compatible with soft gelatin capsules, and free from haze. In order to obtain a solution that is free from haze, and clear, it is preferred that the solvents be incorporated with the dialkyl sulfosuccinate in a particular manner. Thus, for example, it has been found that a blend of polyethylene glycol and propylene glycol will not produce a clear solution of dialkyl sulfosuccinate when the latter is present in concentrations of from 20 to 50 weight percent unless special procedures are followed. It has further been found that the polyhydroxy alcohol must be present in the final product in concentrations of 12.5 percent or less to prevent softening of the gelatin shell when the concentrate is encapsulated directly.

Accordingly, in one form, the composition of the present invention comprises a concentrated solution of a dialkyl sulfosuccinate which is present in concentrations of from 20 to 50 weight percent in a solution containing from 5 to 12.5 weight percent of a nontoxic polyhydroxy alcohol and from 37.5 to 75 weight percent of a polyethylene glycol having a molecular weight of from 200 to 600.

Alternatively, the present invention may be characterized as a liquid concentrate comprising from 20 to 50 weight percent of a nontoxic salt of a dialkyl sulfosuccinate, from 5 to 12.5 weight percent of a nontoxic polyhydroxy alcohol, and a polyethylene glycol of molecular weight of from 200 to 600 to make the balance of 100 percent.

The dialkyl sulfosuccinates contemplated by the present invention are the nontoxic water soluble salts thereof, such as for example, the alkali metal type salts, sodium, potassium and ammonium, of which the sodium salt is particularly preferred. Generally, the dialkyl groups may contain from 5 to 10 carbon atoms each, although the dioctyl(2-ethyl-hexyl)sulfosuccinate is preferred.

The polyhydroxy alcohols are preferably one of the nontoxic polyhydroxy alcohols which contain up to three carbon atoms. Particularly preferred are members of the group consisting of propylene glycol and glycerin.

The polyethylene glycols useful in preparing the present compositions are those of molecular weight of from about 200 to about 600, with an intermediate weight of about 400 being preferred. These materials are also known as polyoxyethylene glycols. While concentrations of from 37.5 to 75 weight percent are indicated, it is also contemplated that other nontoxic and nonphysiologically interfering materials such as fillers or medicaments may be incorporated therewith by adjustment of the percentage of the polyethylene glycol or other ingredients within the specified ranges.

The products of the present invention are prepared by a process which comprises first dissolving a dialkyl sulfosuccinate salt in the polyhydroxy alcohol at elevated temperatures. Generally the concentrations may vary, but it is preferred to utilize about 80 parts of the dialkyl sulfosuccinate per 20 parts of polyhydroxy alcohol. While lesser amounts of sulfosuccinate may be utilized, it is desirable that the amount be sufficient to maintain the concentration of the final product after dilution with polyethylene glycol at about at least 20 percent and the polyhydroxy alcohol below 12.5 percent. The addition of the dialkyl sulfosuccinate is preferably carried out in a portionwise manner until a clear solution results. The resultant intermediate product is then diluted to the desired concentration (20 to 50%) of dialkyl sulfosuccinate by the addition of from 37.5 to 75 percent of polyethylene glycol. The dilution step may be carried out while the intermediate concentrate is still warm or may be carried out when the intermediate solution has cooled to room temperature. The resulting diluted concentrates are characteristically free from haze or cloudiness and do not require filtration but may be encapsulated or incorporated into a medicinal directly.

The following examples will illustrate the preparation of the compositions of the present invention:

*Example I*

Preparation of base solution:

To 20 parts of propylene glycol heated to a temperature of about 95° C. was added 80 parts of dioctyl sodium sulfosuccinate in a portionwise manner with stirring and continued heating. When all of the sulfosuccinate had been added, the solution was permitted to cool. The product was clear and free from all haze.

Preparation of final concentrates:

*Example II*

To 100 parts of the solution prepared as in Example I were added, at room temperature, 60 parts of polyethylene glycol (molecular weight about 400). The resultant product was free from haze and contained 50 weight percent dioctyl sodium sulfosuccinate, 12.5 weight percent of propylene glycol and 37.5 weight percent of polyethylene glycol.

*Example III*

To 100 parts of the solution prepared as in Example I were added 300 parts of polyethylene glycol (molecular weight about 400). The resultant solution contained 20 weight percent of dioctyl sodium sulfosuccinate, 5 percent of propylene glycol and 75% of polyethylene glycol.

*Example IV*

To 20 parts of glycerin heated to a temperature of about 95° C. were added 80 parts of dioctyl sodium sulfosuccinate in a portionwise manner with stirring and continued heating. When all of the sulfosuccinate had been added, the solution was permitted to cool. The product was free from haze.

*Example V*

To 100 parts of the solution prepared in Example IV were added 200 parts by weight of polyethylene glycol (molecular weight about 400). The resultant clear product contained about 26.66 percent of dioctyl sodium sulfosuccinate, about 6.66 percent glycerin and about 66.66 percent polyethylene glycol. The concentrated product was compatible with plasticized gelatin capsules.

While the foregoing examples are restricted to the particular dioctyl sodium sulfosuccinate, the principles therein disclosed are equally applicable to other dialkyl sulfosuccinates of the class described in copending United States patent application of Wilson, Serial No. 544,821, filed November 3, 1955, now abandoned.

While the concentrates of the present invention are particularly adaptable for encapsulation in gelatin capsules, they may be administered to relieve constipation by other well known methods such as in suppositories, or blended into elixirs, which may be administered orally. The concentrates are also useful in that they provide a highly concentrated form of dialkyl sulfosuccinate which may be shipped to drug processors and by them diluted and formulated to the commercial concentrations with a minimumt of processing steps.

While several particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

What is claimed is:

1. A composition comprising a haze-free solution of from 20 to 50 weight percent of a nontoxic salt of a dialkyl sulfosuccinate wherein each of said alkyl groups contains from 5 to 10 carbon atoms, from 5 to 12.5 weight percent of a nontoxic polyhydroxy alcohol containing up to three carbon atoms, and from 37.5 to 75 weight percent of a polyethylene glycol having a molecular weight of from 200 to 600.

2. A composition comprising a haze-free solution of from 20 to 50 weight percent of a nontoxic salt of a dialkyl sulfosuccinate wherein each of said alkyl groups contains from 5 to 10 carbon atoms, said salt being selected from the group consisting of sodium, potassium and ammonium salts, from 5 to 12.5 weight percent of a nontoxic polyhydroxy alcohol selected from the group consisting of propylene glycol and glycerin and from 37.5 to 75 weight percent of a polyethylene glycol having a molecular weight of from 200 to 600, said composition being further characterized as compatible with plasticized sheet gelatin.

3. A composition comprising a haze-free solution of from 20 to 50 weight percent of dioctyl sodium sulfosuccinate, from 5 to 12.5 weight percent of propylene glycol and the balance to make 100 percent of a polyethylene glycol having a molecular weight of about 400 being further characterized as compatible with plasticized sheet gelatin.

4. A composition comprising a haze-free solution of from 20 to 50 weight percent of dioctyl sodium sulfosuccinate, from 5 to 12.5 weight percent of glycerin and the balance to make 100 percent of a polyethylene glycol having a molecular weight of about 400 being further characterized as compatible with plasticized sheet gelatin.

5. A process for preparing clear, concentrated haze-free solution of a dialkyl sulfosuccinate which comprises dissolving a nontoxic salt of said dialkyl sulfosuccinate wherein each of said alkyl groups contains from 5 to 10 carbon atoms in a nontoxic polyhydroxy alcohol containing up to 3 carbon atoms and at elevated temperatures and diluting the resultant clear solution with a polyethylene glycol to make a concentrate containing from about 20 to about 50 weight percent of said dialkyl sulfosuccinate, and less than about 12.5 percent polyhydroxy alcohol.

6. A process for preparing a clear concentrated haze-free solution of a dialkyl sulfosuccinate which comprises dissolving about 80 parts of said nontoxic salt of a dialkyl sulfosuccinate wherein each of said alkyl groups contains from 5 to 10 carbon atoms in about 20 parts of a heated polyhydroxy alcohol selected from the group consisting of propylene glycol and glycerin and diluting the resultant solution with a polyethylene glycol of molecular weight of from 200 to 600 to make a concentrate containing from about 20 to about 50 weight percent of said dialkyl sulfosuccinate.

7. A process for preparing a clear concentrated haze-free solution of a dialkyl sulfosuccinate which comprises dissolving about 80 parts of dioctyl sodium sulfosuccinate in about 20 parts of a heated propylene glycol and diluting the resulting solution with a polyethylene glycol having a molecular weight of about 400 to produce a concentrate containing from about 20 to about 50 weight percent of said dioctyl sodium sulfosuccinate.

8. The process of claim 7 wherein the dissolving of the dioctyl sulfosuccinate is carried out by portionwise addition to the propylene glycol.

9. The process of claim 8 wherein the propylene glycol is heated to about 95° C.

10. The process of claim 7 wherein the dilution step is carried out at about normal room temperature.

References Cited in the file of this patent

Aerosol Wetting Agents, 1941, Am. Cyanamid and Chem. Corp., N.Y.C., pp. 3, 13 and 14.

"Carbowax" Compounds and Polyethylene Glycols, June 30, 1946, pp. 3, 4 and 9.